United States Patent [19]
Ruthenberg

[11] 3,784,215
[45] Jan. 8, 1974

[54] INTERLOCKING JOINT FOR SEALING RINGS

[75] Inventor: Meyer L. Ruthenberg, Owings Mills, Md.

[73] Assignee: Koppers Company, Inc., Pittsburgh, Pa.

[22] Filed: Nov. 12, 1971

[21] Appl. No.: 198,245

[52] U.S. Cl.............................. 277/220, 251/306
[51] Int. Cl............................ F16j 9/24, F16r 1/22
[58] Field of Search.................. 277/218, 219, 220, 277/221, 222, 216; 251/306

[56] References Cited
UNITED STATES PATENTS
3,567,179  3/1971  Radtke................................ 277/220
1,635,407  7/1927  Grover................................ 277/220

FOREIGN PATENTS OR APPLICATIONS
323,971  1/1930  Great Britain.................... 277/220
324,406  1/1930  Great Britain.................... 277/221

Primary Examiner—Samuel B. Rothberg
Attorney—Boyce C. Dent, Oscar B. Brumbach and Olin E. Williams

[57] ABSTRACT

An interlocking joint assembly for annular split sealing rings where overlapping end sections form both radial and axial sealing faces; the end sections are formed with axially opposed overlapping segments creating a pair of axially overlapping radial sealing interfaces at the opposed ends of the sealing ring and a pair of axially offset axial sealing interfaces extending radially from the midportion of the ring to the outer radial face of the ring.

2 Claims, 5 Drawing Figures

INTERLOCKING JOINT FOR SEALING RINGS

BACKGROUND OF THE INVENTION

1. Field of the Invention

This invention relates generally to a split annulus with a jointing structure and more particularly to an interlocking joint assembly for a split annular sealing ring having cooperating pairs of radial sealing interfaces and pairs of axial sealing interfaces.

2. Description of the Prior Art

Split sealing rings capable of effectively sealing in both a radial and axial direction and capable of remaining in their respective ring grooves are well known, but their effective sealing capabilities and their ability to remain in their ring groove are dependent upon the sealing rings remaining in constant contact with the surface to be sealed. If the sealing rings become disengaged from the surface to be sealed, for example, the engagement and disengagement action created in a butterfly valve, the sealing rings, upon disengagement, will expand circumferentially, opening up the joint, and possibly causing the sealing rings to pop out of their ring groove. To overcome this deficiency, methods such as pinning the sealing rings to their ring grooves have been used. This method retained the sealing rings in their ring groove when in a free position, but this created another deficiency. With the sealing rings pinned to their ring groove they are not free to rotate about the ring groove. Thus, for example in a butterfly valve, when the sealing rings are being positioned for engagement with the surface to be sealed they have the tendency to rotate, but because the sealing rings are constrained in their ring groove they are restrained from rotating, and because of this constraint unwanted drag forces are constantly acting on the sealing rings, causing the sealing rings to deform and wear unevenly. This deformation and uneven wearing will reduce the life of the sealing rings and effectively reduce their sealing capabilities.

SUMMARY OF THE INVENTION

Accordingly, an object of the present invention is to provide an interlocking joint assembly that will overcome the aforementioned disadvantages and others.

These and other objects and advantages are generally accomplished by providing a joint assembly having overlapping end sections which form both a radial face sealing means and an axial face sealing means. The overlapping end sections include similar axially opposed overlapping segments, which, when acting together form a pair of axially overlapping radial sealing interfaces on opposing sides of the split sealing ring and a pair of axially offset axial sealing interfaces extending radially from a mid-portion of the split sealing ring to the outer face of the ring. The axially opposed overlapping segments include axially extending cooperating step portions that form a circumferential constraint against the opening of the split sealing ring when the ring is in a free position. The step portions are formed with sufficient circumferential length so that the radial sealing surfaces are in constant sealing engagement when the ring is constrained circumferentially.

Thus, when the split sealing rings are engaged with the surface to be sealed they will provide an effective seal in both a radial and axial direction and when in a free position the joint will be constrained from opening in the circumferential and radial direction thus permitting the split sealing ring to freely rotate in the ring groove when it is being positioned for engagement with the surface to be sealed.

The above and further objects and novel features of the invention will appear more fully from the following detailed description when the same is read in connection with the accompanying drawings. It is expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

FIGS. 1, 2, 3 and 4 illustrates an interlocking joint assembly 10 of the present invention when associated with a split annular sealing ring 12. The interlocking joint assembly 10 generally comprises substantially overlapping end sections 14 and 16 which form a radial face sealing means and an axial face sealing means.

Figure 1:
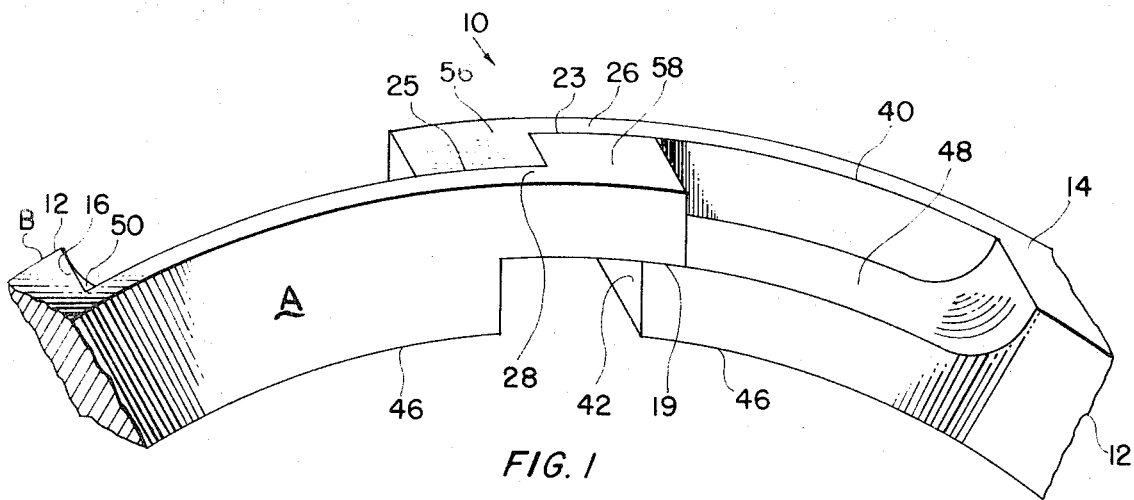
FIG. 1 is a perspective illustration of the interlocking joint assembly of the present invention shown in a locked free position.
Figure 4:
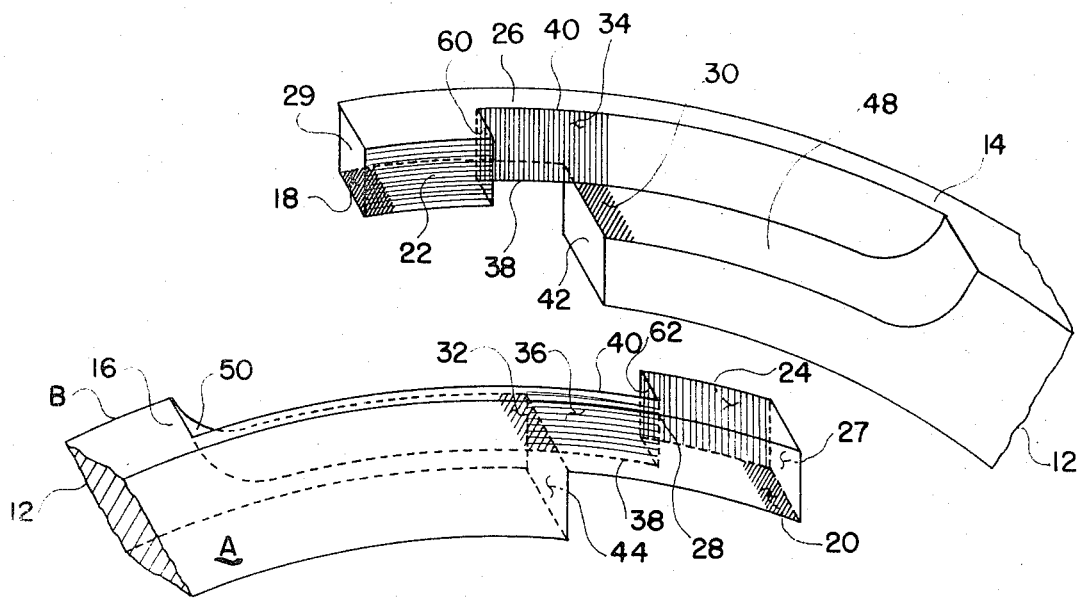
FIG. 4 is a perspective view of the interlocking joint assembly in a disengaged condition to show a pair of radial sealing surfaces and a pair of axial sealing surfaces, as depicted by the shaded surfaces.
Figure 2:
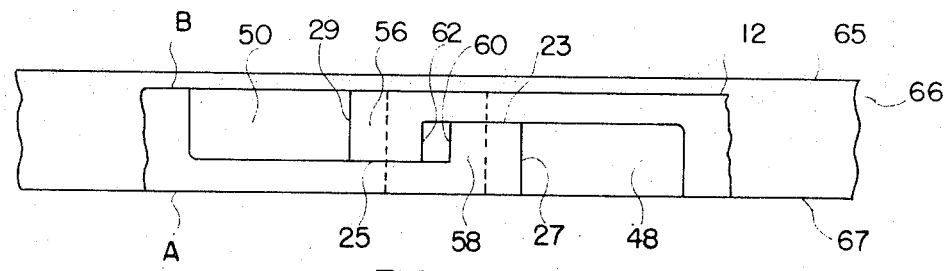
FIG. 2 is a top plan view of the interlocking joint assembly of FIG. 1 shown in a closed position in a ring groove.
Figure 3:
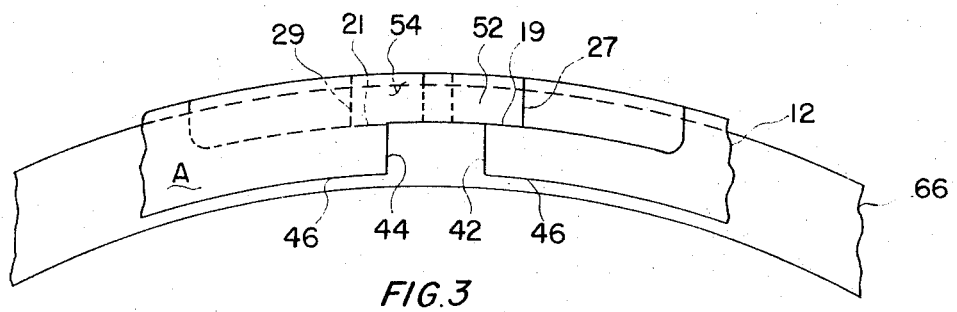
FIG. 3 is a side elevation of the interlocking joint assembly of FIG. 2.

The overlapping end sections 14 and 16 include similar axially opposed overlapping end segments 26 and 28 which extend circumferentially a sufficient amount from surfaces 42 and 44 which together form a pair of axially overlapping radial sealing interfaces 19 and 21 (see FIGS. 2 and 3) on opposite sides of ring 12. Sealing interfaces 19 and 21 are spaced circumferentially with respect to a midportion of the joint assembly 10 defined by opposed surfaces 42 and 44. Sealing interface 19 comprises abutting surfaces 20 and 30 illustrated by the shaved areas in FIG. 4. Similarly, sealing interface 21 comprises abutting surfaces 18 and 32. The axially opposed overlapping end segments 26 and 28 further form a pair of axially offset axial sealing interfaces 23 and 25 which extend radially from a midportion 38 of ring 12 to a radial face 40 together forming the axial face sealing means. Sealing interfaces 23 and 25 are axially offset, as shown in FIGS. 2 and 3, and extend radially from midportion 38 to the radial face 40 of ring 12. Sealing interface 23 comprises abutting surfaces 22 and 36 illustrated by the shaded areas in FIG. 4. Similarly, sealing interface 25 comprises abutting surfaces 24 and 34.

To form an effective radial seal, the pair of radial sealing interfaces 19 and 21 are circumferentially offset, as previously mentioned, thereby blocking fluid flow from the backside 46 of ring 12 to face 40 of ring 12.

Thus, as best shown in FIG. 3, interface 19 prevents the flow of fluid radially along surface 42, cirumferentially between abutting surfaces 20 and 30 of interface 19, and then radially along surface 27. Similarly, fluid is prevented from flowing along surface 44, between abutting surfaces 18 and 32 of interface 21 and surface 29.

To form an effective axial seal, the pair of axial sealing interfaces 23 and 25 are also circumferentially offset, on opposing ends of ring 12, thereby blocking fluid flow on the sides A and B of ring 12 (see FIG. 2).

As best shown in FIG. 2, interface 23 prevents the flow of fluid circumferentially between abutting surfaces 24 and 34, axially between surfaces 60 and 62, and then circumferentially between abutting surfaces 22 and 36. Similarly, fluid is prevented from flowing circumferentially between abutting surfaces 22 and 36, axially between surfaces 60 and 62, and then circumferentially between surfaces 24 and 34.

To properly form the pair of radial sealing interfaces 19 and 21, the axially opposed overlapping segments 26 and 28 must be of sufficient circumferential length to radially overlap a land 48 and 50 formed in the backside of each overlapping end section 14 and 16. Thus, forming the offset radial sealing interfaces 19 and 21.

Joint assembly 10 has the capability of providing an effective unidirectional seal in the axial direction, by allowing surfaces 22 and 36 to abut one another forming interface 25 and by having surfaces 24 and 34 axially spaced from one another at interface 23 (both interfaces 25 and 23 shown abutting in FIG. 2). Assuming that fluid pressure on Side B of ring 12 is greater than fluid pressure on side A, side A of ring 12 will be forced against side 67 of ring groove 66. Fluid on side B of ring 12 will then pass between surfaces 42 and 44 (FIG. 3) into the space between surfaces 60 and 62 (FIG. 2), then pass circumferentially between surfaces 24 and 34 of interface 23, and pass by surface 27 to the low pressure side of ring 12. Assuming the fluid pressure on side A of ring 12 is greater than the fluid pressure on side B, side B will then be forced against side 65 of ring groove 66 opposite to that shown in FIG. 2. Fluid on side A of ring 12 will then pass between surfaces 42 and 44 and into the space between surfaces 60 and 62, but fluid will be blocked from flowing between surfaces 22 and 36 at interface 25 due to surfaces 22 and 36 abutting one another, thereby blocking any fluid from flowing to the low pressure side B of ring 12. Similarly, an unidirectional seal in the opposite direction may be formed by allowing surfaces 24 and 34 to abut one another forming interface 23 and by having surfaces 22 and 36 axially spaced from one another at interface 25. To accomplish this unidirectional flow the overlapping end sections 14 and 16 include opposing axially spaced circumferentially extending radial surfaces 52 and 54 of which only one of the extending radial surfaces 52 or 54 include an axial projection 56 or 58 which abutt the opposed axial surface 34 or 36.

In some applications it is more preferable to have a bidirectional seal in the axial direction by allowing both surfaces 22 and 36 and 24 and 34 to abutt one another forming interfaces 25 and 23 respectively, (as shown in FIG. 2) wherein fluid will be blocked from flowing from surface B circumferentially between surfaces 22 and 36, of interface 25 and from flowing from surface A circumferentially between surfaces 24 and 34 of interface 23. To accomplish this bidirectional restraint to flow, both opposing axially spaced circumferentially extending radial surfaces 52 and 54 contain an axial projection 56 and 58 which abutt the opposed axial surfaces 34 and 36.

Joint assembly 10 has an additional capability of providing an effective unidirectional seal in the radial direction by allowing surfaces 18 and 32 to abut one another forming interface 21 and by having surfaces 20 and 30 radially spaced from one another at interface 19 (both interfaces 19 and 21 shown abutting in FIG. 3). Assuming that fluid pressure on side B of ring 12 is greater than fluid pressure on side A, side A of ring 12 will be forced against side 67 of ring groove 66. Fluid on side B of ring 12 will then pass between surfaces 42 and 44 (FIG. 3), then circumferentially between surfaces 20 and 30 of interface 19, and pass by surface 27 to the low pressure side of ring 12. Assuming the fluid pressure on side A of ring 12 is greater than the fluid pressure on side B, side B will then be forced against side 65 of ring groove 66 opposite to that shown in FIG. 2. Fluid on side A of ring 12 will then pass between surfaces 42 and 44, but fluid will be blocked from flowing between surfaces 18 and 32 at interface 21, due to surfaces 18 and 32 abutting one another, thereby blocking any fluid from flowing to the low pressure side B of ring 12. Similarly, an unidirectional seal in the opposite direction may be formed by allowing surfaces 20 and 30 to abutt one another forming interface 19 and by having surfaces 18 and 32 radially spaced from one another at interface 21. To accomplish this unidirectional flow, only one of the axially opposed overlapping segments 26 or 28 abutts the opposed radial surface 30 or 32.

In some applications, it is more preferable to have a bidirectional seal in the radial direction by allowing both surfaces 20 and 30 and 18 and 32 to abutt one another forming interfaces 19 and 21 respectively (as shown in FIG. 3), wherein fluid will be blocked from flowing from surface B circumferentially between surfaces 20 and 30, of interface 19 and from flowing from surface A circumferentially between surfaces 18 and 32 of interface 21. To accomplish this bidirectional restraint to flow, both axially opposed overlapping segments 26 and 28 abutt the opposed radial surfaces 30 and 32.

The primary purpose of the present invention is to provide a sealing ring with an interlocking joint assembly capable of maintaining the ring in its ring groove while in a free position, i.e. when a ring is not engaged with a bore, as is the condition created by the action of a fluid valve operating in a butterfly valve, and at the same time to allow the ring to freely rotate within the ring groove. To accomplish this the sealing ring, while in the free state, must be constrained from opening, and thereby snaping out of the ring groove, in both the circumferential and radial direction. To provide ring 12 with this capability, the axially opposed overlapping segments 26 and 28 include axially extending cooperating step portions which are the axial projections 56 and 58 previously mentioned. Thus, when ring 12 is not engaged with a bore the resilient action of the ring expands the ring circumferentially until surfaces 60 and 62 abutt each other and thereby constrain the ring from opening any further, thus a circumferential constraint is formed for constraining ring 12 from opening in a circumferential direction. By providing the axially extending cooperating step portions 56 and 58 with sufficient circumferential length so as to continuously overlap lands 48 and 50 when surfaces 60 and 62 are abutting, a radial constraint is formed for constraining ring 12 from opening in a radial direction. With this arrangement ring 12 will always be constrained, while in the free position in both the circumferential and radial direction.

Because of the inherent circumferential and radial constraints associated with the joint assembly, ordinary methods of installing a sealing ring in a ring groove are not applicable. To install a sealing ring with the above joint arrangement, the ring first has to be opened to allow the ring to pass over the piston, then once in the ring groove the ends have to be separated axially inorder for the step portions to pass over and under one another. Then the ring has to be circumferentially contracted until the step portions pass one another and then the ring is allowed to snap into place. This process cannot be accomplished in the ordinary way, because the axial separation necessary for the step portions to pass over and under one another is greater than the axial width of the ring groove. Therefore, a new method must be devised.

One method of installation (not shown) would be to have the top part of the piston removable at the ring groove. Once the top part of the piston is removed, the sealing ring could be placed in the ring groove in the locked position and then the top part of the piston would be reinstalled. This may be accomplished by having the top part of the piston bolted to the bottom part.

Another method of installation (not shown) may be used for sealing rings with diameters in excess of about ten inches. In this method, the sealing ring is separated at the joint and expanded circumferentially a sufficient amount to allow the ring to slip over the piston and position itself in a ring groove. The ring is then manually expanded radially at the joint until there is a radial space between the ring and the outer surface of the piston. The joint is then axially separated to deform the ring until the step portions will pass over one another in the axial direction. Then the ring is contracted circumferentially until the step portions slide over and under one another and snap into the locked position. The ring is then allowed to contract radially into the ring groove. Sealing rings of this diameter are flexible enough to allow them to be expanded radially and axially a sufficient amount to lock the joint without exceeding the elastic limit of the ring.

Figure 5:
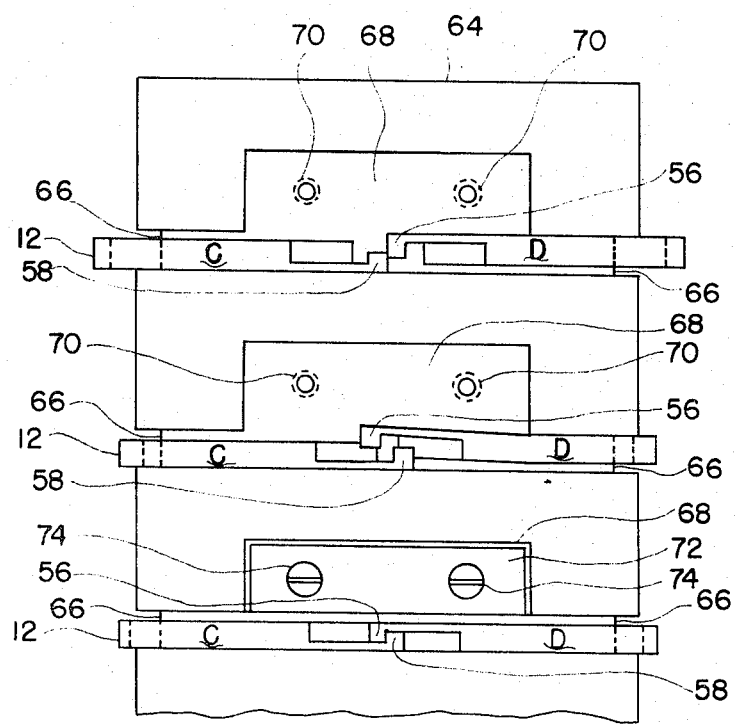
FIG. 5 is a side elevation of a piston having three ring grooves to illustrate a step-by-step method, from top to bottom, of installing the ring of FIG. 1 into a ring groove.

The preferred method of installation is shown in FIG. 5 for sealing rings less than about ten inches in diameter. A recess 68 is cut into the face of a piston 64 extending axially from a ring groove 66 a sufficient amount to allow the axial separation of the step portions 56 and 58, and extending circumferentially around the periphery of piston 64 a sufficient amount to allow ring 12 to be axially forced apart at the joint without exceeding the elastic limit of the ring. Recess 68 is provided with drilled and tapped holes 70 to allow installation of a filler member 72 after installation of ring 12. Referring to the top portion of FIG. 5, ring 12 is shown separated at the joint and expanded circumferentially a sufficient amount to allow ring 12 to slip over piston 64 and position itself in ring groove 66. At this position the ends of step portions 56 and 58 abutt one another, but are not in the locked position. Step portions 56 and 58 are not able to slide over one another because the combined axial width of step portions 56 and 58 is greater than the axial width of ring groove 66.

Referring to the middle portion of FIG. 5, end D of ring 12 is forced axially into recess 68 until step portion 56 is able to slide over step portion 58. When this occurs, ring 12 is contracted circumferentially until step portion 56 is circumferentially spaced from step portion 58 over end C. End D of ring 12 is then allowed to spring into its locked position as shown in the bottom portion of FIG. 5.

Referring to the bottom portion of FIG. 5, once ring 12 is placed in the locked position in ring groove 66, ring 12 is constrained from opening in the circumferential and radial direction. To prevent the possibility of the joint separating when it is positioned in recess 68, a filler member 72, with holes drilled to correspond to the drilled and tapped holes 70 in recess 68, is secured in recess 68 by screws 74. Thus, the upper surface of ring groove 66 is continued circumferentially along the circumferential length at recess 68, thereby maintaining the geometry of ring groove 66 around the entire periphery of piston 64.

Having thus described the invention in its best embodiment and mode of operation, that which is desired to be claimed by Letters Patent is:

1. An interlocking joint assembly for a split annular sealing ring, comprising:

substantially overlapping end sections forming a circumferential constraint means and a radial constraint means for said joint assembly, said circumferential constraint means comprising circumferentially overlapped axially opposed segments on the ends of said end sections respectively, each segment including an axially extending step portion circum-ferentially interlocked with the corresponding step portion of the opposite segment, for circumferentially constraining said joint assembly in a free position of said ring;

and said radial constraint means comprising axially opposed lands recessed in the outer periphery of said end sections extending circumferentially from said step por-tions respectively, each of said segments having inner sealing surfaces recessed in the inner periphery of said end sections extending circumfer-entially from the free ends of said segments beyond said step portions, said inner sealing surfaces slidably overlapping said lands on the circumferentially opposite end sections respect-ively with said segments in said circumferen-tially overlapped position, for continuously locking said joint assembly in a radial direction in both a closed position and said free position of said ring.

2. The interlocking joint assembly of claim 1 wherein a radial face on each of said segments continuously abutts a corresponding radial face extending radially from the land on the opposite end section; and each of said sealing surfaces continuously radially abutts said lands on the opposite one of said end sections.

* * * * *